United States Patent
Bar-on

(10) Patent No.: US 11,947,775 B2
(45) Date of Patent: Apr. 2, 2024

(54) SERVICE FOR EXTRACTING MESSAGE DATA FOR DISPLAY IN USER INTERFACE WIDGETS

(71) Applicants: Atlassian Pty Ltd., Sydney (AU); Atlassian Inc., San Francisco, CA (US)

(72) Inventor: Noam Bar-on, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 20 days.

(21) Appl. No.: 17/359,356

(22) Filed: Jun. 25, 2021

(65) Prior Publication Data

US 2022/0413660 A1    Dec. 29, 2022

(51) Int. Cl.
*G06F 40/20* (2020.01)
*G06F 3/0482* (2013.01)
*H04L 51/42* (2022.01)

(52) U.S. Cl.
CPC .......... *G06F 3/0482* (2013.01); *G06F 40/20* (2020.01); *H04L 51/42* (2022.05)

(58) Field of Classification Search
CPC ......... H04L 51/42; G06F 40/20; G06F 3/0482
See application file for complete search history.

(56) References Cited

U.S. PATENT DOCUMENTS

| | | | |
|---|---|---|---|
| 7,673,342 B2* | 3/2010 | Hursey | G06Q 10/107 713/188 |
| 8,595,186 B1* | 11/2013 | Mandyam | G06F 8/38 717/178 |
| 9,485,212 B1* | 11/2016 | Bastide | H04L 51/224 |
| 2011/0289428 A1* | 11/2011 | Yuen | H04L 51/04 715/752 |
| 2012/0010995 A1* | 1/2012 | Skirpa | G06F 16/9577 705/14.49 |
| 2015/0100503 A1* | 4/2015 | Lobo | G06Q 10/103 705/301 |
| 2015/0350134 A1* | 12/2015 | Yang | H04L 67/1095 709/206 |
| 2018/0024730 A1* | 1/2018 | Jambou | G06F 9/451 715/763 |
| 2018/0189408 A1* | 7/2018 | O'Driscoll | H04L 51/02 |
| 2018/0278561 A1* | 9/2018 | Carnevale | H04L 51/212 |

* cited by examiner

*Primary Examiner* — Andrea C Leggett
(74) *Attorney, Agent, or Firm* — Brownstein Hyatt Farber Schreck, LLP

(57) ABSTRACT

A widget management service may analyze messages (e.g., email messages or other electronic messages) to determine clusters of similar messages, such as messages based on a common template or otherwise having high levels of similarity to one another. Within these message clusters, the widget management service may analyze messages to determine unique content (e.g., content that differs across messages) for extraction and presentation in widgets in the graphical user interface.

20 Claims, 13 Drawing Sheets

SERVICE FOR EXTRACTING MESSAGE DATA FOR DISPLAY IN USER INTERFACE WIDGETS

TECHNICAL FIELD

Embodiments described herein relate to electronic messaging systems and, in particular, to systems and methods for extracting data from electronic messages to create and display widgets in a graphical user interface.

BACKGROUND

Electronic messaging is leveraged for a wide variety of personal and professional purposes. Electronic messages may include vast amounts of data, only a portion of which may be relevant to the user. Many traditional software tools fail to extract and display the most useful portion of an email communication. The systems and techniques described herein can be used to address some of the shortcomings with current email readers and message clients.

SUMMARY

Embodiments of the systems, devices, methods, and apparatuses described in the present disclosure are directed to extracting data from electronic messages to create and display widgets in a graphical user interface.

One embodiment may take the form of a method that includes the step of receiving via a graphical user interface on a client device, a first user input indicating a request to create a widget based on a primary email message displayed in the graphical user interface. The method further includes the steps of creating a first array of content nodes by analyzing the primary email message, each content node of the first array comprising a portion of the primary email message, and identifying a first set of email messages having a common sender with the primary email message. The method further includes the steps of, for each email message in the first set of email messages, creating a second array of content nodes, each content node of the second array comprising a portion of the email message, determining a similarity score between the primary email message and the email message by comparing the first array of content nodes to the second array of content nodes, and responsive to the similarity score exceeding a similarity threshold, identifying a set of unique content nodes of the first array by identifying content nodes of the first array that differ from corresponding content nodes of the second array. The method further includes the steps of presenting, in the graphical user interface, at least a portion of the primary email message with the portions of the primary email message that correspond to unique content nodes displayed differently from other portions of the primary email message and receiving, via the graphical user interface, a second user input indicating a unique content node of the set of unique content nodes for use in generating the widget. The method further includes the steps of extracting variable content that corresponds to the unique content node from each of the first set of email messages, generating the widget using the extracted variable content, and displaying the widget in the graphical user interface.

Another embodiment may take the form of a method that includes the steps of receiving a new email message and creating a new email array of content nodes by analyzing the new email message, each content node of the new email array comprising a portion of the new email message. The method further includes the step of determining a similarity score between the new email array and a primary array of content nodes corresponding to a widget displayed in a graphical user interface, each content node of the primary array comprising a portion of a primary email message associated with the widget. The method further includes the step of, responsive to the similarity score exceeding a similarity threshold, extracting data from a content node of the new email message that corresponds to a unique content node of the primary array. The method further includes the steps of updating the widget using the extracted data and presenting the updated widget in the graphical user interface.

Another embodiment may take the form of a system that includes a client device and a widget management service. The client device may operate a client application configured to receive, via a graphical user interface provided by the client application, a first user input indicating a request to create a widget based on a primary email message displayed in the graphical user interface. The widget management service may be configured to create a first array of content nodes by analyzing the primary email message, each content node of the first array comprising a portion of the primary email message. The widget management service may be further configured to identify a secondary email message having a common sender with the primary email message and create a second array of content nodes, each content node of the second array comprising a portion of the secondary email message. The widget management service may be further configured to determine a similarity score between the primary email message and the secondary email message by comparing the first array of content nodes to the second array of content nodes and, responsive to the similarity score exceeding a similarity threshold, identify a set of unique content nodes of the first array by identifying content nodes of the first array that differ from corresponding content nodes of the second array. The widget management service may be further configured to present, in the graphical user interface, at least a portion of the primary email message with the portions of the primary email message that correspond to unique content nodes displayed differently from other portions of the primary email message and extract, from the second email message, variable content that corresponds to a unique content node of the set of unique content nodes. The widget management service may be further configured to generate the widget using the extracted variable content and cause the client application to display the widget in the graphical user interface.

In addition to the example aspects and embodiments described above, further aspects and embodiments will become apparent by reference to the drawings and by study of the following description.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
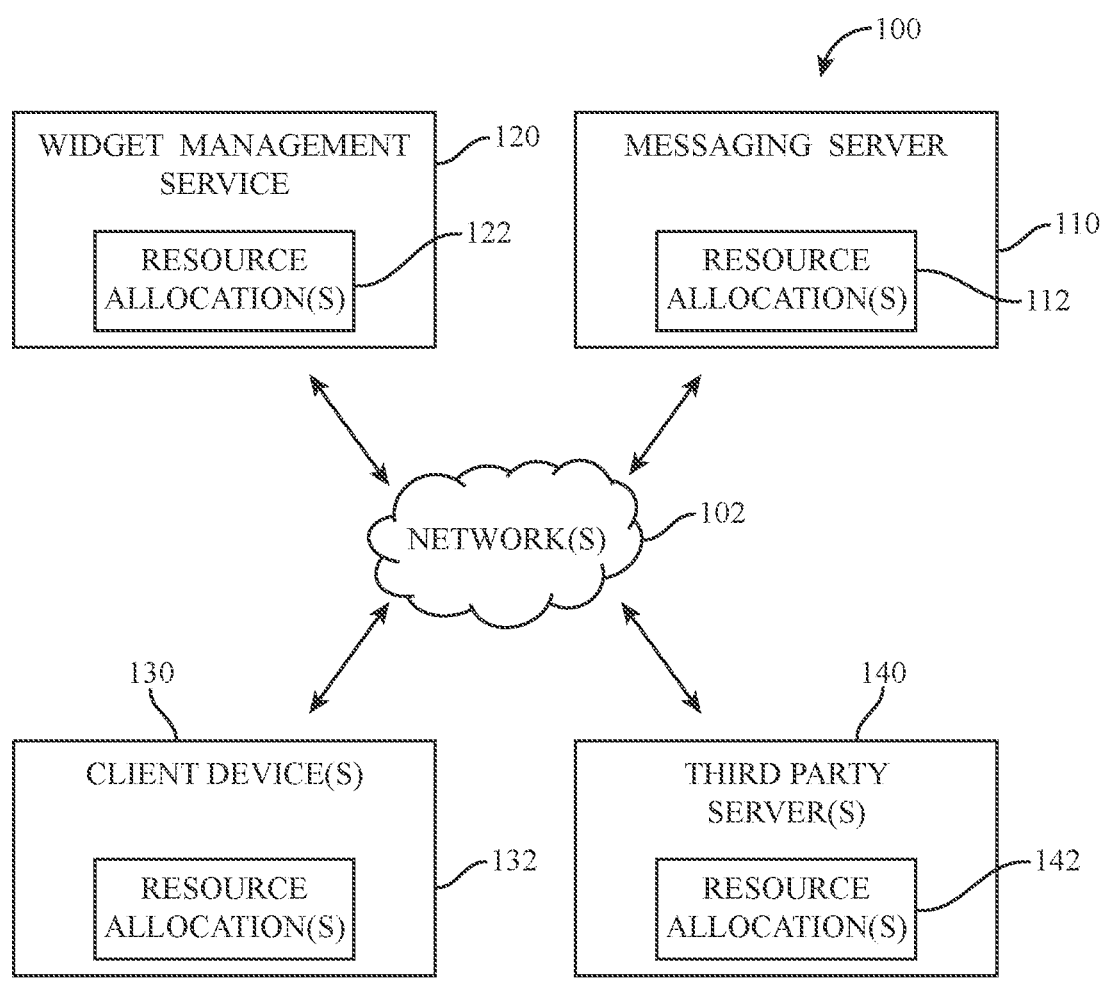
FIG. 1 depicts a system configured to extract data from electronic messages to create and display widgets in a graphical user interface.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for extracting data from electronic messages to create and display widgets in a graphical user interface. A widget management service may analyze messages (e.g., email messages or other electronic messages) to determine clusters of similar messages, such as messages based on a common template or otherwise having high levels of similarity to one another. Within these message clusters, the widget management service may analyze messages to determine unique content (e.g., content that differs across messages) for extraction and presentation in widgets in the graphical user interface. The widget management service may additionally or alternatively extract non-unique (e.g., fixed) content (e.g., content that is consistent across a cluster of messages). The widgets described herein may include data elements for presenting extracted data, such as textual elements, numerical elements, charts, graphs, or other graphical elements.

For purposes of the following description the term "widget" may be used to refer to a graphical object or user-interface element that displays content extracted from one or more emails or messages. The term "widget management service" may be used to refer to the application or microservice or portion of the application or microservice that performs many of the operations used to generate the content for the widget. The widget management service may be implemented as a plug-in, extension or be integrated with an email or messaging client application.

As one example, email client application of an email service may receive multiple messages from a bank indicating a payment amount and a payment recipient for each of a series of different payments. Each of the multiple messages may have significant amounts of common content, while the information corresponding to the particular payment (e.g., payment date, payment amount, payment recipient, a link to a webpage associated with the payment, etc.) may be unique across different messages. It may be advantageous for a user to see the payment information in a different format than that provided by a traditional email viewer. For example, it may be useful to see a list of the payment amounts and/or recipients corresponding to multiple emails along with a payment date in an easy-to-digest widget.

Data extracted from messages and displayed in widgets may include text strings and/or numerical values. The example above references providing a list of extracted data from multiple messages, but numerous other presentation formats are within the scope of this disclosure. Additional examples include displaying data from a most-recent message of a cluster, displaying data from a filtered subset of messages of a cluster (e.g., messages that deviate from a pattern), displaying an aggregated metric determined from multiple messages of a cluster (e.g., average, sum, etc.), displaying a graph or chart corresponding to extracted data from one or more messages, and/or displaying progress toward a particular amount (e.g., a savings goal, a budgeted amount, etc.). In addition to or alternatively to displaying extracted data in widgets, the widget management service may present extracted data in the form of notifications or alerts (e.g., push notifications) on an electronic device.

The widget management service may provide the graphical user interface for displaying widgets via a client application executing on or otherwise accessible by a client device. The client application may display messages (e.g., email messages) in addition to or alternatively to displaying widgets. In some cases, users may provide inputs to the client application to initiate a widget creation process. Users may provide an input while viewing a particular message to create a widget based on that message, as discussed in more detail below with respect to FIG. 4. A message so used to create a widget may be a primary message with respect to the widget creation process. Users may provide additional input(s) to configure and customize a widget.

As noted above, the widget management service may identify a cluster based on the primary message, the cluster including one or more messages that correspond to the primary message. As explained in more detail below, cluster messages may be those messages exceeding a similarity threshold with respect to the primary message). In some cases, the widget management service initially identifies messages having the same sender as the primary message for comparison with the primary message. For messages in the cluster, the widget management service may identify unique content across the messages. As part of the widget creation process, the widget management service may display the primary message (or another message) in the graphical user interface with special formatting designating unique portions of the message, which are displayed differently from other portions of the message. The interface may be configured to receive user selections and edits that can be used to change node or segment classifications, edit portions of the message or expressly designate portions of the message as unique or not unique to improve the automated analysis of the messages. In some cases, the user input can be used to improve the automated designation during future analyses.

During the widget creation process, the user may indicate unique content and other content from a message for inclusion in the widget, along with other configuration information, such as presentation format. Once created, a widget configuration file may be stored by the widget management service for later use by the same instance of the client application and/or other instances of the client application. Once created, the data displayed by a widget may be determined from the same set of messages used to create the widget or a different set of messages. For example, a widget may display data from messages in a particular folder or directory (e.g., an email inbox), messages received during a particular time period, or all messages determined to be sufficiently similar to the primary email message.

Many embodiments described herein are described with respect to email messages, which may also be referred to as emails. An email is typically a file formatted according to, and/or otherwise compliant with, one or more protocols and is sent via the open Internet from a sender to a recipient. More specifically, an email, such as described herein originates at first client device that generates and sends that email to a sender server, also referred to herein as a "third-party server" or "SMTP server" that communicably couples with an "email host" server associated with an email provider, of which the recipient of the email is a subscriber. At a later time, a second client device operated by the recipient (herein, "end user" or "recipient") communicably couples to the email host and receives a copy of the email sent from the sender, which may also include metadata information such as message-identifying information and/or server identifying information. Such information, along with other email metadata included in the email received at the client device is referred to as "header" information.

Each client device operated by an end-user may include a processor and a memory. The processor can be configured to execute program code and/or instructions stored in the memory to instantiate an instance of an electronic mail client application that, in turn, is configured to communicably couple to, and exchange information with, an email host server and/or an SMTP server. In these examples, the electronic mail client application can receive and/or otherwise process email messages stored on the email host server.

The embodiments described herein are described with respect to email messages for purposes of providing examples, the embodiments described herein may be used with any type of electronic message from a wide variety of messaging protocols, including web-chat (e.g., a chat application of a web-page hosted), extensible messaging and presence protocol (XMPP), short message service (SMS) texting, multimedia messaging service (MMS), mobile chat (e.g., via an application installed on a client device, chat services provided by gaming consoles, and application program interfaces (APIs) that third party application can use to send messages, among others).

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a system 100 configured to extract data from electronic messages to create and display widgets in a graphical user interface. In the illustrated example embodiment, the system 100 includes a messaging server 110 which is communicably coupled to a widget management service 120, one or more client devices 130, and one or more third-party servers 140. The system 100 also includes one or more networks 102 that enable communication between the various components of the system 100.

The third-party servers 140 can be further communicably coupled to one or more additional client devices (not shown), which the third-party servers 140 can send messages to and receive messages from. In this architecture, the system 100 may be a messaging system (e.g., an email communication system), and the client devices 130 and the other client devices (not shown) can be operated by senders and receivers of messages (e.g., emails). As one example, the messaging server 110 may be an email provider for users of the client devices 130, and the third-party server 140 may be an email provider for users of client devices communicably coupled to the third party server.

In various embodiments, the messaging server 110 may be communicably coupled to the third-party server 140 via one or more email message sending communication protocols, such as the Simple Mail Transfer Protocol ("SMTP"). The messaging server 110 and the third-party server 140 may also be communicably coupled to the client devices 130 and the other client devices (not shown) via one or more email message receipt communication protocols, such as the Internet Message Access Protocol ("IMAP"), the Post Office Protocol (e.g., "POP3"), or other protocols, such as Microsoft's Exchange/ActiveSync protocol. The components of the system 100 may additionally or alternatively be communicably coupled to one another via other messaging protocols, including web-chat (e.g., a chat application of a web-page), extensible messaging and presence protocol (XMPP), short message service (SMS) texting, multimedia messaging service (MMS), mobile chat (e.g., via an application installed on a client device, chat services provided by gaming consoles, and application program interfaces (APIs) that third party application can use to send messages, among others).

It is appreciated that the foregoing embodiment depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

For example, each server or service of the system 100 of FIG. 1 can be implemented in a number of suitable ways. As illustrated, the messaging server 110, the widget management service 120, the third-party server 140 and the client devices 130 each include one or more purpose-configured components, which may be either software or hardware. In particular, it may be appreciated that although these functional elements are identified as separate and distinct devices (e.g., servers) that can each include allocations of physical or virtual resources (identified in the figure as the resource allocations 112, 122, 132, and 142), such as one or more processors, memory, and/or communication modules (e.g., network connections and the like), that such an implementation is not required. More generally, it may be appreciated that the various functions described herein can be performed by any suitable physical hardware, virtual machine, containerized machine, or any combination thereof.

The widget management service 120 may provide the graphical user interface for displaying widgets via a client application executing on or otherwise accessible by a client device 130. Each client device 130 may execute an instance of a client application (e.g., an email client application) for sending and receiving messages (e.g., email messages), displaying messages, and/or displaying widgets that include data extracted from messages, as described in more detail below with respect to FIGS. 2A-6. That is, the widget management service 120 may be implemented wholly or in part on each respective client device 130 and resource allocations 122 and resource allocations 232 may be shared resource allocations of the client device 130.

The widget management service 120 may create widgets for presentation in the graphical user interface provided at the client device(s) 130. The widget management service 120 may receive messages from the messaging server 110 for displaying messages in the graphical user interface and for receiving user inputs to create widgets based on the messages. In some cases, a user input may be received via the graphical user interface while a message is displayed to create a widget based on the displayed message (the "primary message" for purposes of the widget creation process). The widget management service 120 may identify a cluster of similar messages and then determine unique content of the messages for display in a widget.

The widget management service 120 may identify the similar messages by creating an array of content nodes for the primary message and each of a group of additional messages (e.g., messages from the same sender or messages sharing other message attributes). The widget management service 120 may compare the arrays of content nodes for the primary message and each of the group of additional messages to determine a similarity score. In some cases, the similarity score is determined by performing a longest common subsequence analysis. If the similarity score exceeds a similarity threshold (e.g., 50%, 75%, 80%, 90%, or higher), the additional message is added to the cluster for further analysis.

Once the cluster of messages is established, the widget management service 120 identifies unique nodes, which are nodes that differ across different emails of the cluster. As part of the widget creation process, the widget management service 120 may display the primary message (or another message) in the graphical user interface with portions of the message corresponding to unique nodes of the message displayed differently from other portions of the message. In some cases, a user may provide additional inputs to identify portions of the message as unique nodes or non-unique (e.g., fixed) nodes to improve the automated analysis of the messages.

During the widget creation process, the user may indicate unique content and other content from a message for inclusion in the widget, along with other configuration information, such as presentation format. Once created, a widget configuration file may be stored by the widget management service 120 for later use by the same instance of the client application and/or other instances of the client application. Once created, the data displayed by a widget may be determined from the same set of emails used to create the widget or a different set of emails. For example, a widget may display data from messages in a particular folder or directory (e.g., an email inbox), messages received during a particular time period, or all messages determined to be sufficiently similar to the primary email message.

Figure 2A:
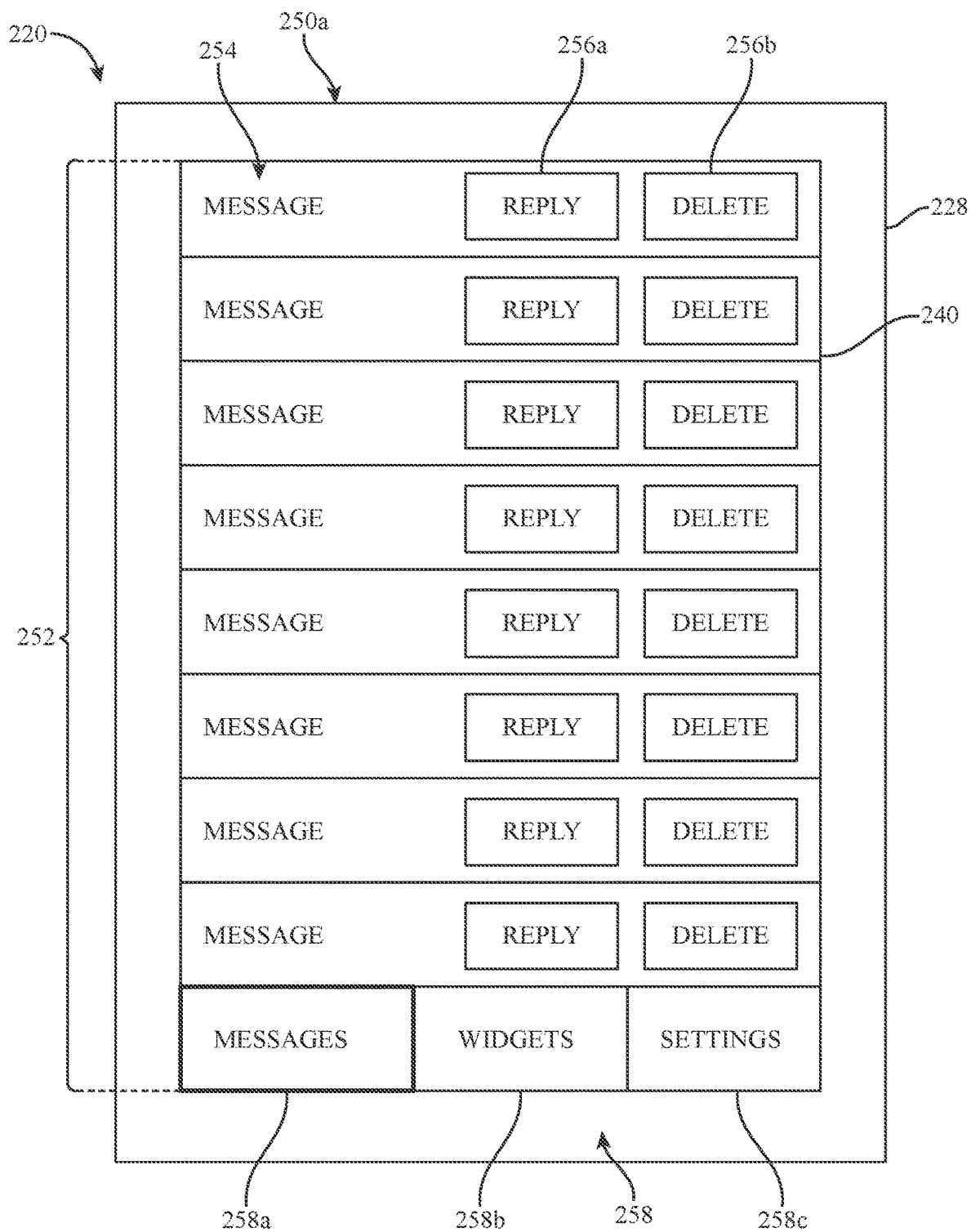
FIGS. 2A-2C depict an example client device executing an instance of a client application (e.g., an email client application) configured to display widgets in a graphical user interface.
Figure 2B:
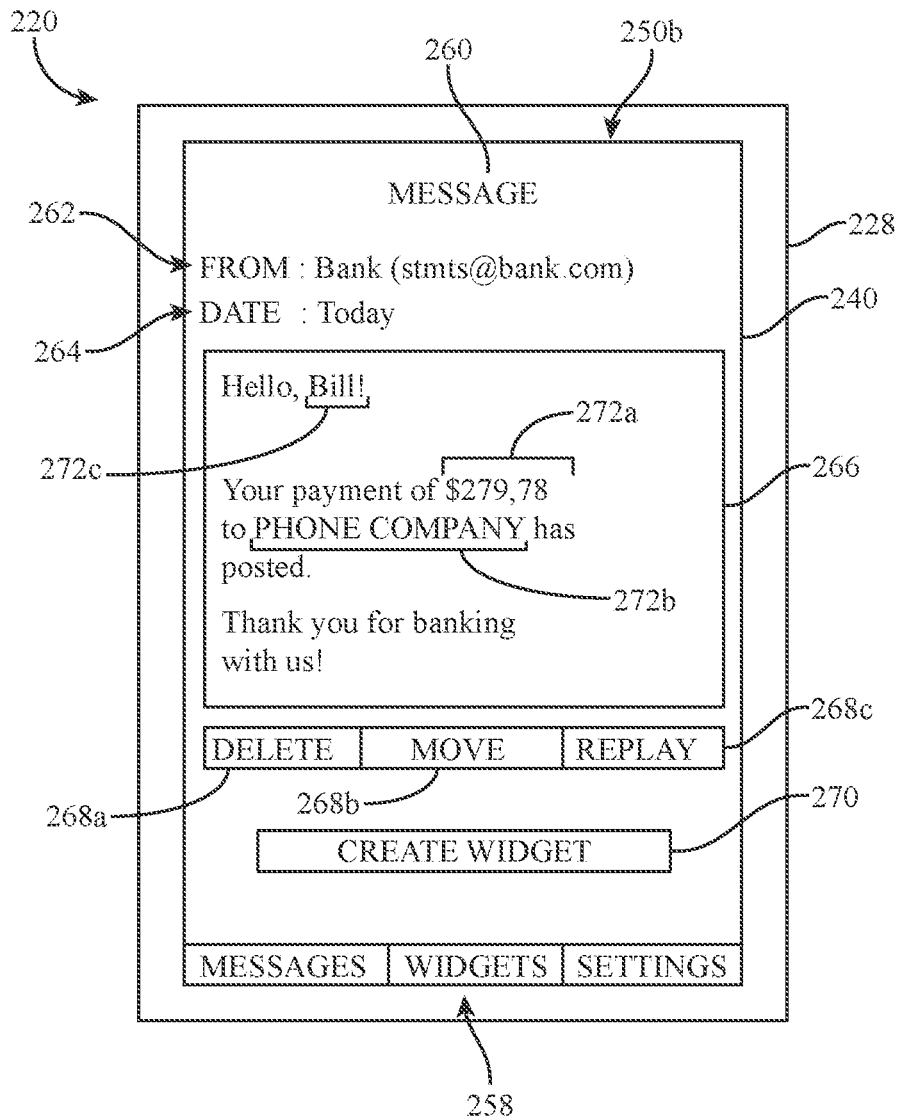
Figure 2C:
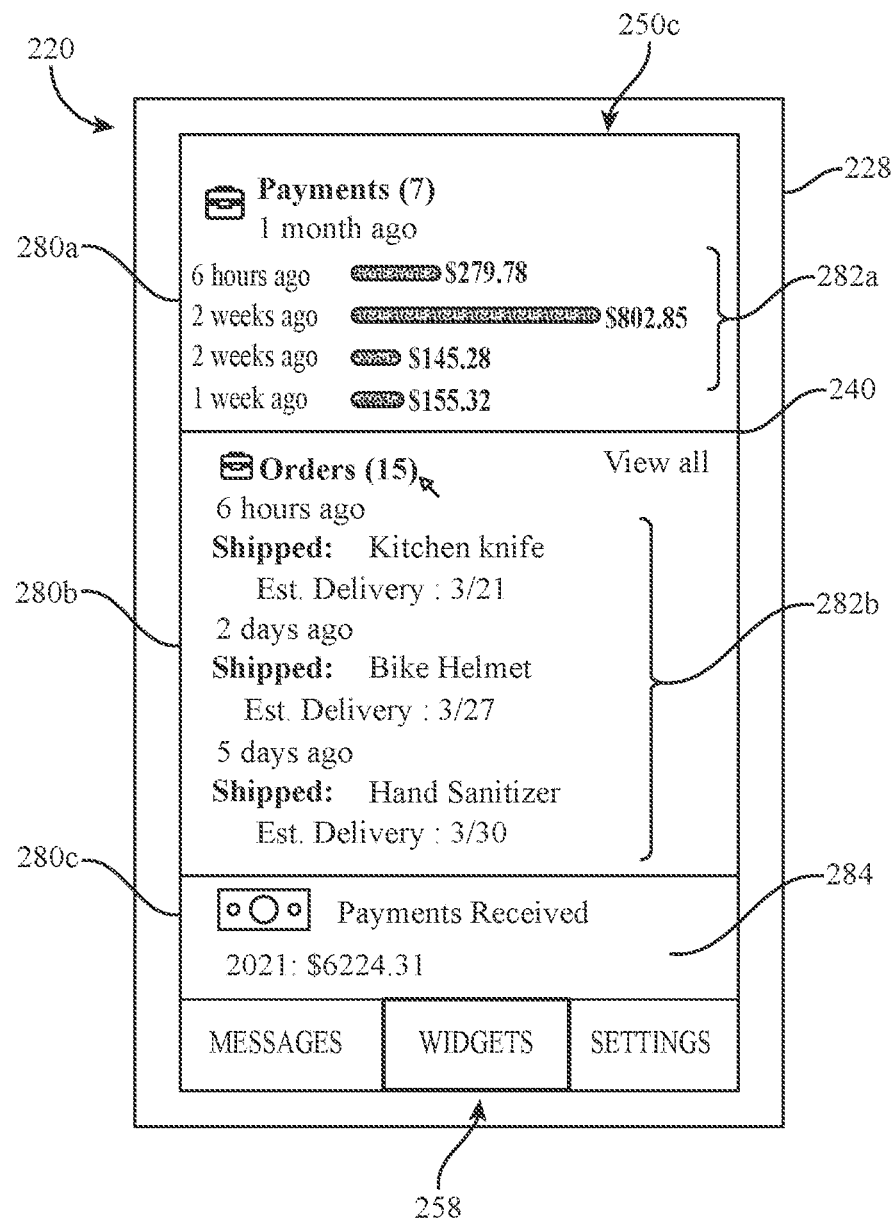

FIGS. 2A-2C depict an example client device 220 executing an instance of a client application (e.g., an email client application) configured to display widgets in a graphical user interface, such as described herein. In some cases, the client application may display email messages (or portions thereof) in the graphical user interface in addition to or alternatively to displaying widgets. The client device 220 includes a housing 228 that encloses and supports a display 240 (e.g., a touchscreen display). The display 240 can be leveraged by the instance of the client application to generate graphical user interfaces. Although each of these figures illustrates the example client device 220 as a mobile phone, it may be appreciated that this is merely one example. In other configurations and/or architectures, other electronic devices can be used including desktop computers, laptops, tablet devices, and wearable devices.

The client application can be defined by executable code or instructions stored in a persistent memory of the client device 220. A processor of the client device 220 can be communicably coupled to the persistent memory and can access the persistent memory to load at least a portion of the executable code or instructions into a working memory in order to instantiate the client application. For simplicity of description, an instantiated client application is referred to herein, simply as a client application. For simplicity of illustration, the client device 220 is depicted without a processor, a working memory, or a persistent memory; it may be appreciated however that such components (also referred to as resource allocations with reference to FIG. 1) may be included within the housing 228 or in another location.

As noted herein, the graphical user interface rendered by the client application is configured to present information related to messages received by a user of the client device 220, including messages and/or widgets. The graphical user interface may include different views that display different information and/or user interface elements (e.g., widgets). In one example embodiment shown in FIG. 2A, a view 250a of the graphical user interface may include a message list 252 that includes messages for viewing in the graphical user interface. The messages may include, for example, email messages or other electronic messages associated with one or more user accounts. The message list 252 may be similar to a traditional email inbox, and may include elements 254 for each message. An element 254 may be or include text or other data extracted from the message (e.g., from an email header, subject, snippet, or body). For example, the element 254 may include information about the message that is typical of an email inbox, such as a subject, a sender, and/or at least part of the snippet or body of a message.

The message list 252 may include one or more actionable buttons (e.g., buttons 256a, 256b), which can be leveraged by the user to instruct the client application to perform one or more actions, including replying to a communication, forwarding a communication, deleting a communication, moving a communication, and the like.

The user may select a message of the message list 252 to view more information about the message, including message content, such as the example embodiment shown in FIG. 2B. In the example embodiment shown in FIG. 2B, a view 250b of the graphical user interface may include a message tile or region, which may include data extracted from a message, such as a subject 260, sender 262, date 264, body 266, and actionable buttons 268a—c. The view 250b may include a create widget element 270 that allows a user to initiate creation of a widget based on the displayed message, as discussed in more detail below with respect to FIGS. 2A-3F.

The various views 250a—c of the graphical user interface may include a view selector 258 that allows the user to view different views of the graphical user interface. In FIGS. 2A and 2B, the messages button 258a is selected, so the list of messages 252 is displayed. The user may select the settings button 258c to display a settings view to configure the client application, update account settings, and the like. The user may select the widgets button 258b to display a list of widgets, such as in the example embodiment shown in FIG. 2C.

In the example embodiment shown in FIG. 2C, a view 250c of the graphical user interface may include one or more widgets 280a—c. As noted herein, the widgets 280a—c may include one or more graphical elements that display information determined from data extracted from messages analyzed by the widget management service. The widgets 280a—c may be constructed based on one or more selected widget types including, without limitation, a numeric type, which may include a list sub-type, a last message sub-type, and sum sub-type, and a text type, which may include a last message sub-type, a list sub-type, and an alert sub-type, or any other formatting scheme designed to visualize the important or variable information in a cluster of emails. The graphical elements of each widget 280a—c may correspond to one or more unique content nodes identified in a message (e.g., an email message), as discussed in more detail below with respect to FIGS. 3-5. As one example, email messages notifying a bank customer of payments may have a common structure, but each message may include certain unique content related to a particular payment to which the message corresponds. For example, as shown in the message body 266 shown in FIG. 2B, the message content may include a payment amount 272a and a payment recipient 272b. The message content may additionally or alternatively include a link (e.g., a hyperlink to a webpage associated with the message). The widget management service may identify this unique content in the message for extraction and display using a widget. For example, as shown in FIG. 2C, the payments widget 280a may include a list 282a of payment amounts extracted from different emails along with an elapsed time since each payment was made. The payments widget 280a may further include a graphical element (e.g., the bars) indicating the relative amounts of the payments so a user can easily see larger relative amounts.

The example widget 280a may be a list- and/or numeric-type widget and includes numerical data extracted from multiple messages. Additionally or alternatively, the displayed extracted data may include text strings, links (e.g., hyperlinks), and/or other types of data. The example widget 280b may be a list-type widget and includes a list 282b of names of items from online orders that have shipped along with estimated delivery dates for each item. Additionally or alternatively, the widget management service may determine aggregated metrics determined from data extracted from multiple messages, including averages, sums, and the like. The example widget 280c may be a numeric-type widget and includes an aggregated metric 284 that indicates a total amount of payments (e.g., a sum) determined by extracting amounts from multiple messages and adding them together.

Additional examples include displaying data from a most-recent message of a cluster, displaying data from a filtered subset of messages of a cluster (e.g., messages that deviate from a pattern), displaying a graph or chart corresponding to extracted data from one or more messages, and/or displaying progress toward a particular amount (e.g., a savings goal, a budgeted amount, etc.). In addition to or alternatively to displaying extracted data in widgets, the widget management service may present extracted data in the form of notifications or alerts (e.g., push notifications) on an electronic device.

FIGS. 3A-3F depict a graphical user interface on the client device 220 for creating a widget. A user may initiate a widget creation process by providing a user input via the graphical user interface, such as selecting the "Create Widget" button 270 shown in FIG. 2B. In some cases, the message being displayed when the user provides the input is the primary message with respect to the widget creation process, as discussed in more detail below with respect to FIG. 4. The graphical user interface may include multiple views related to the widget creation process that allow users to create and configure widgets.

Figure 3A:
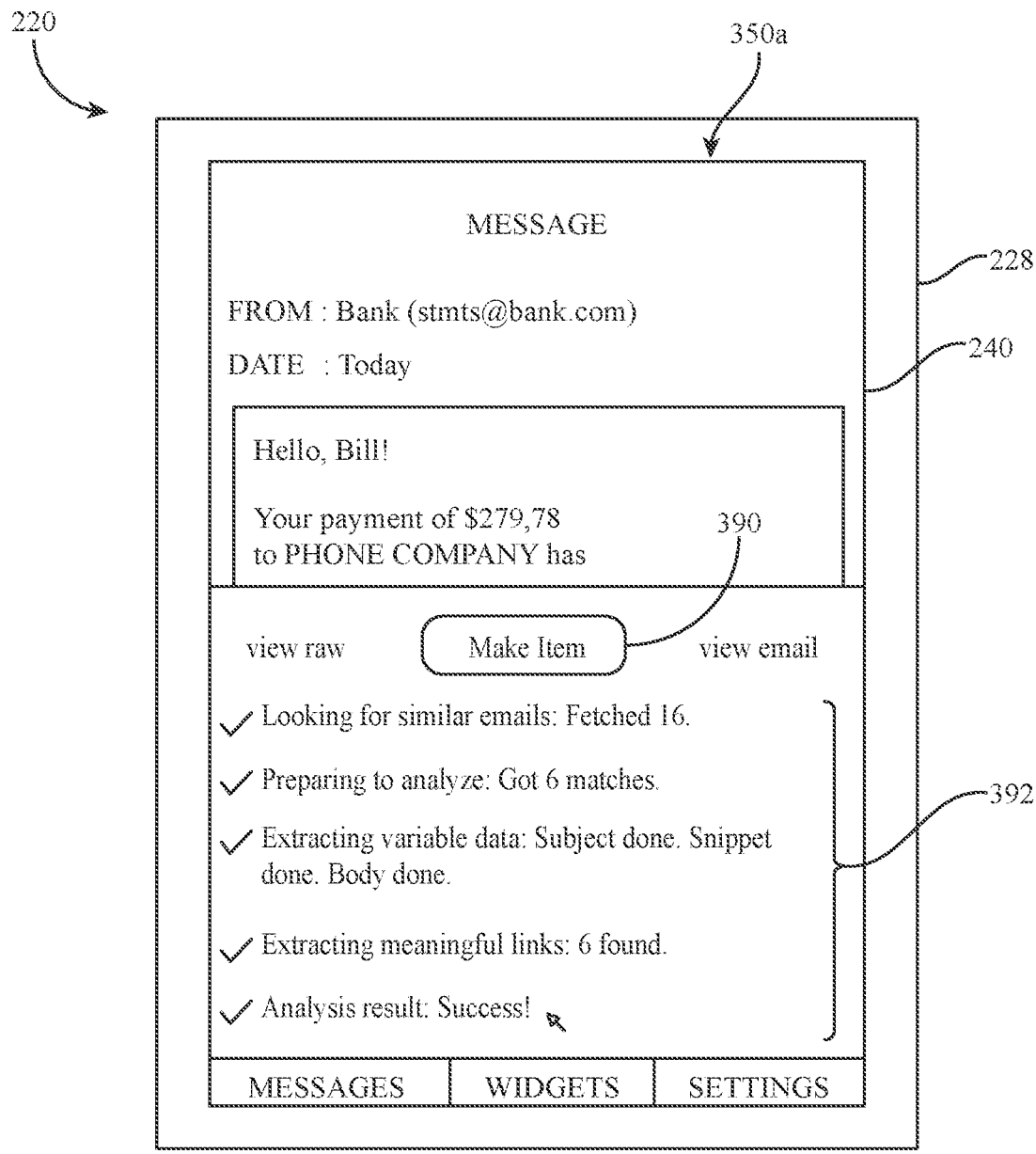
FIGS. 3A-3F depict a graphical user interface on the client device for creating a widget.

FIG. 3A depicts an example view 350a that may be presented in response to the user selecting the "Create Widget" button 270 shown in FIG. 2B, or by another user input to initiate a widget creation process. The view 350a may include a "Make Item" button 390 and information 392 regarding the widget creation process, as discussed in more detail below with respect to FIG. 4. A user may select the "Make Item" button to proceed to the view 350b shown in FIG. 3B.

Figure 3B:
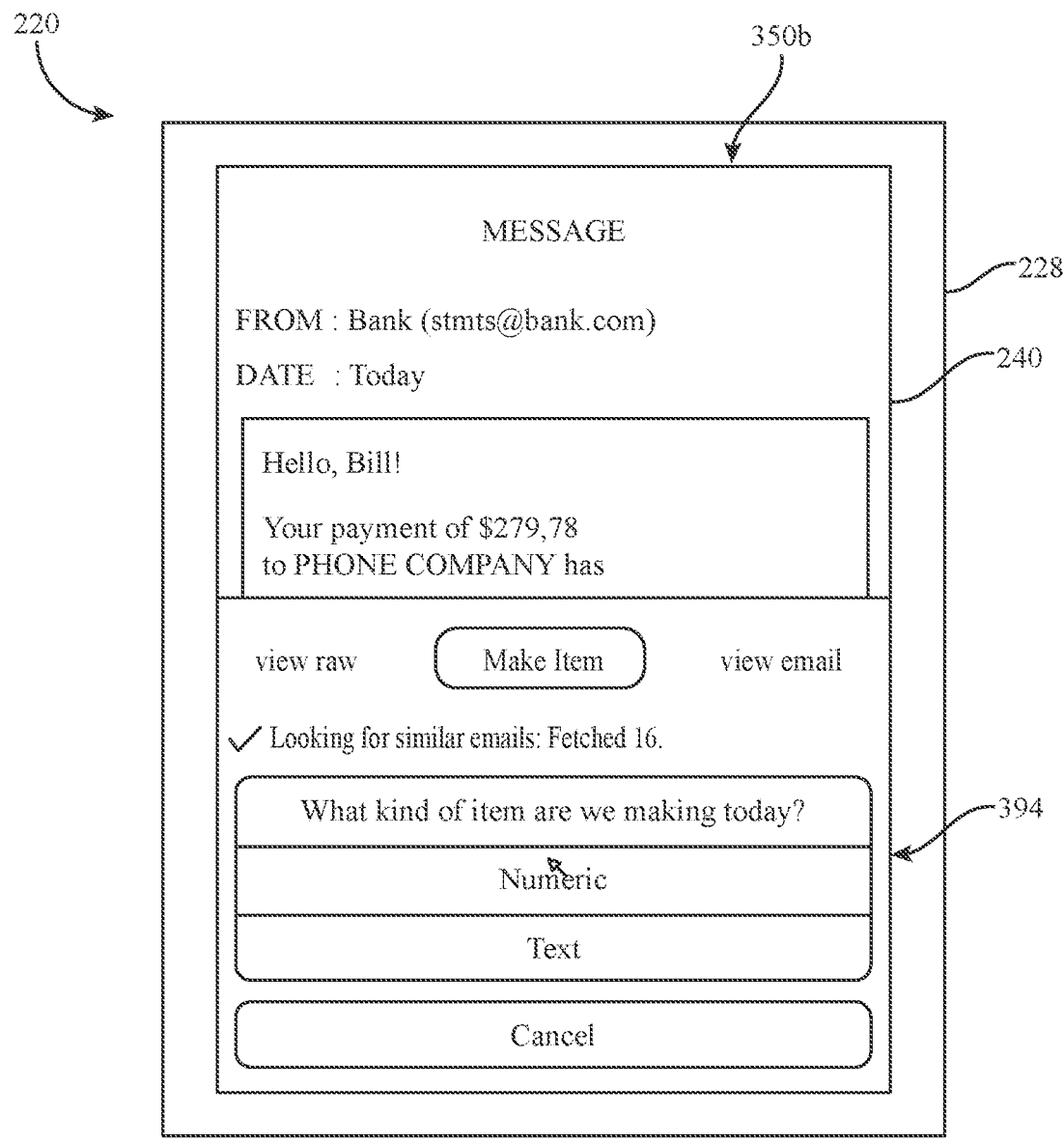

Turning to FIG. 3B, a user may optionally be prompted to provide a user input regarding a widget type. As noted herein, widgets may include numerical data, text strings, links, and/or other types of data. Upon selecting the "Numeric" widget type, the graphical user interface may proceed to the view 350c shown in FIG. 3C. Upon selecting the "Text" widget type, the graphical user interface may proceed to the view 350f shown in FIG. 3F. Note that, in some cases, a user need not select between a numeric widget or a text widget, as widgets may display both numeric and textual data (in addition to other types of data).

Figure 3C:
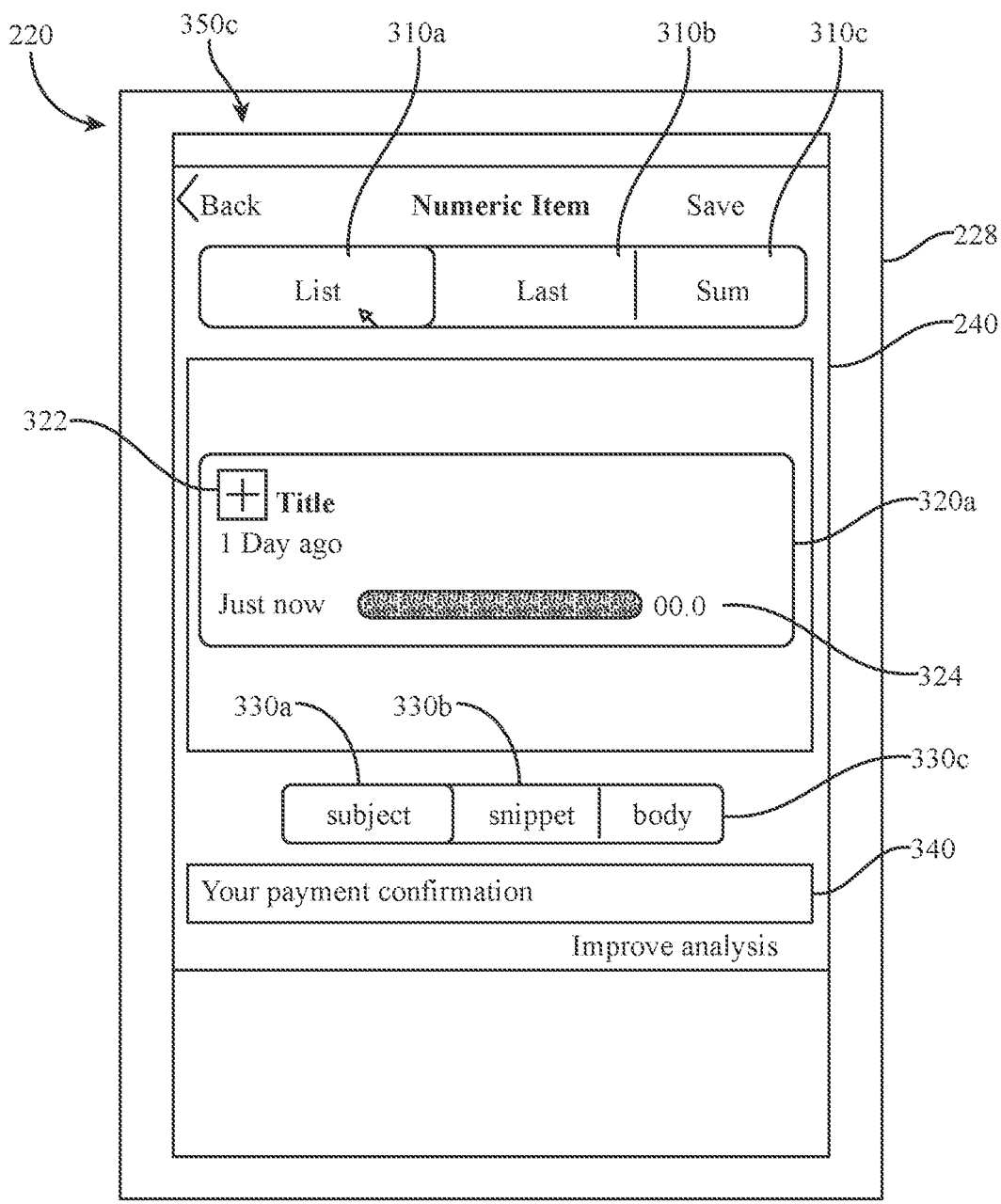

FIG. 3C depicts an example view 350c for configuring a widget. The view 350c may include a widget preview 320a, which shows a preview of the widget being created. A user may select a presentation format using the buttons 310a, 310b, and 310c. The widget may be configured to display a list of data extracted from messages of a cluster by a user selecting the "List" button 310a, to display data extracted from a most-recent (e.g., last) message of a cluster by the user selecting the "Last" button 310b, or to display an aggregated metric (e.g., a sum) of numerical data extracted from a cluster of messages by selecting the "Sum" button 310c. Note that the example presentation formats shown and described with respect to FIG. 3C are examples and are not meant to be limiting. In various embodiments, users may select additional or alternative presentation formats by providing inputs to the graphical user interface.

The view 350c may include message navigation buttons 330a—c for displaying different portions of the primary message. The navigation buttons 330a—c may include a subject button 330a to display the subject of the primary message in a display area 340 of the view 350c of FIG. 3C, a snippet button 330b to display the snippet of the primary message in the display area 340 (as shown in a view 350d depicted in FIG. 3D), and/or a body button 330c to display the body text of the primary message in the display area 340. As noted herein, the widget management service may analyze messages to determine unique content (e.g., unique content nodes) in the primary message for display to the user. Analyzing messages to determine unique content is discussed in more detail with respect to FIG. 4 below. The portions of the primary message corresponding to unique content nodes may be displayed differently from other portions of the primary message. For example, as shown in the view 350d depicted in FIG. 3D, the payment amount ($279.78) and the payment recipient ("PHONE COMPANY") may be displayed in bold text to indicate that those portions of the message have been identified as unique content.

Figure 3D:
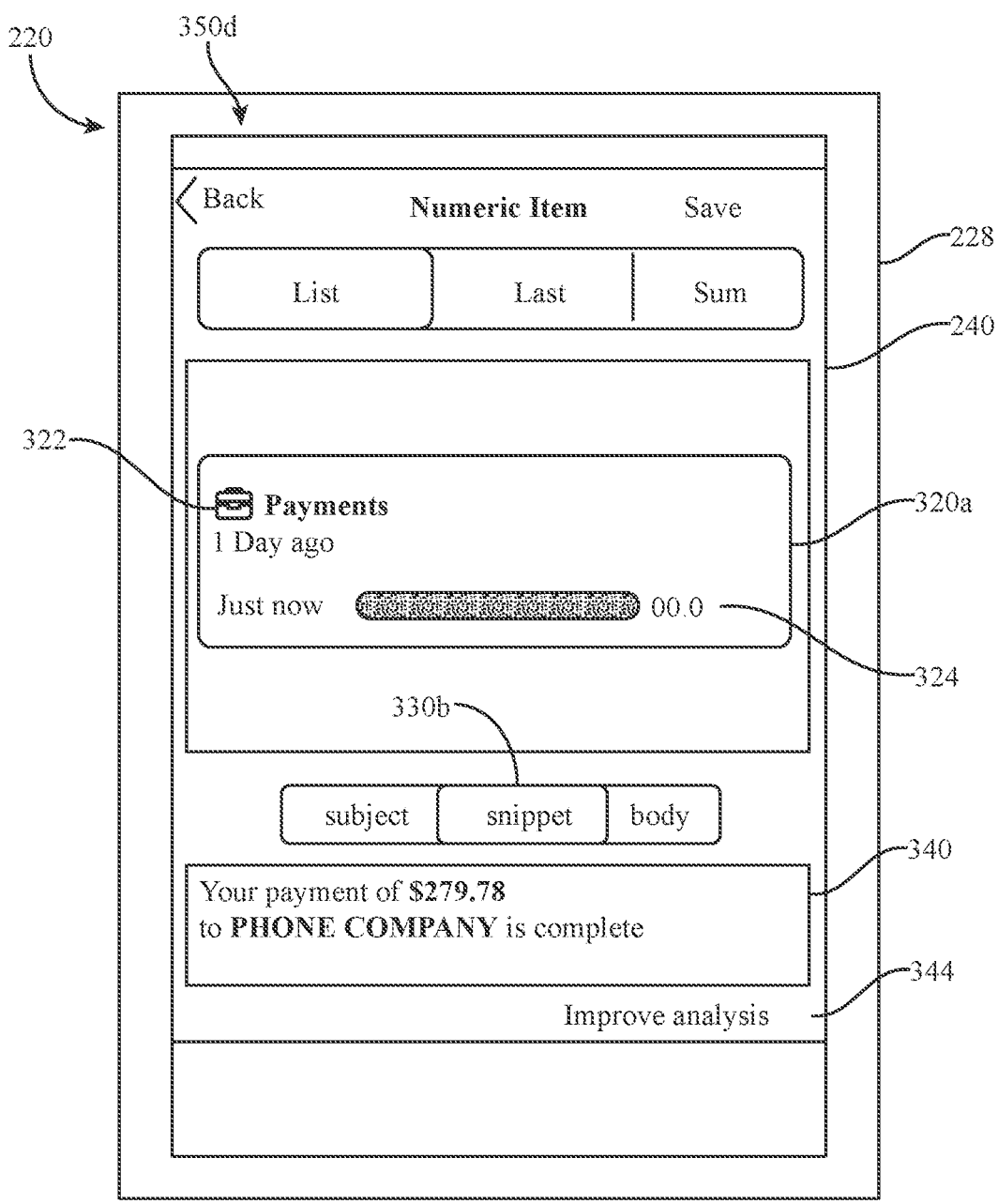
Figure 3E:
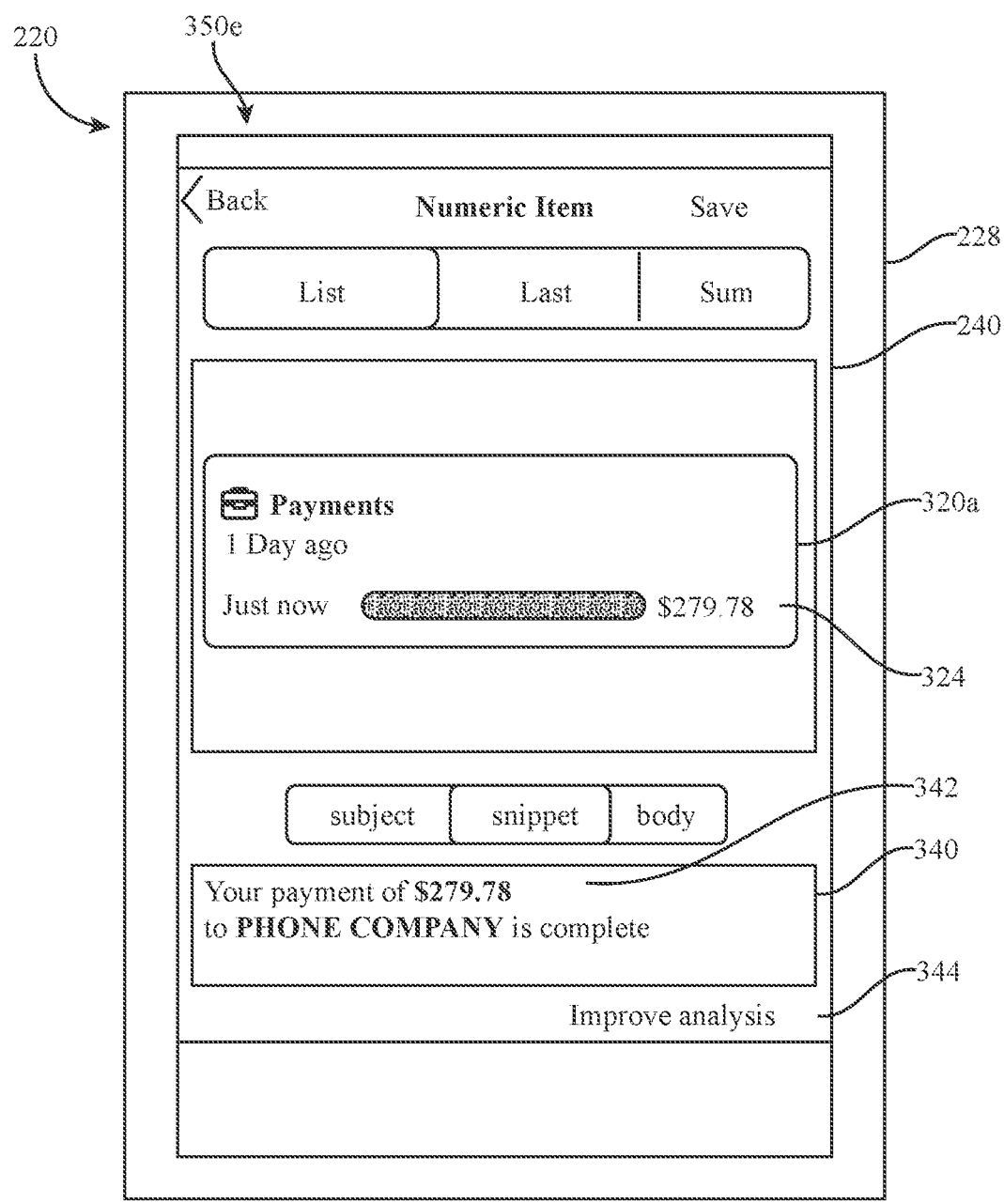

Returning to FIG. 3C, the widget preview 320a may include user-editable fields (e.g., a title field 322) and/or data elements (e.g., data element 324) that correspond to graphical elements of the widget being created. The user may configure the widget by interacting with the widget preview 320a. As one example, the user may add a title and/or icon for the widget by selecting the title field 322 and providing a title (such as the title and icon shown in FIG. 3D). Turning to FIG. 3D, additionally or alternatively, the user may configure the data element 324 by selecting the data element and selecting content (e.g., unique content) in the display area 340 for display using the data element 324. For example, as shown in FIG. 3E, a user may select the payment amount for display in the widget. Note that when the widget is applied to additional messages, the widget will display different payment amounts corresponding to different messages.

The graphical user interface may additionally or alternatively include an "improve analysis" button 344 that activates a view that allows a user to edit which portions of the message are identified as unique, for example by selecting different parts of the message and indicating whether they are unique.

Figure 3F:
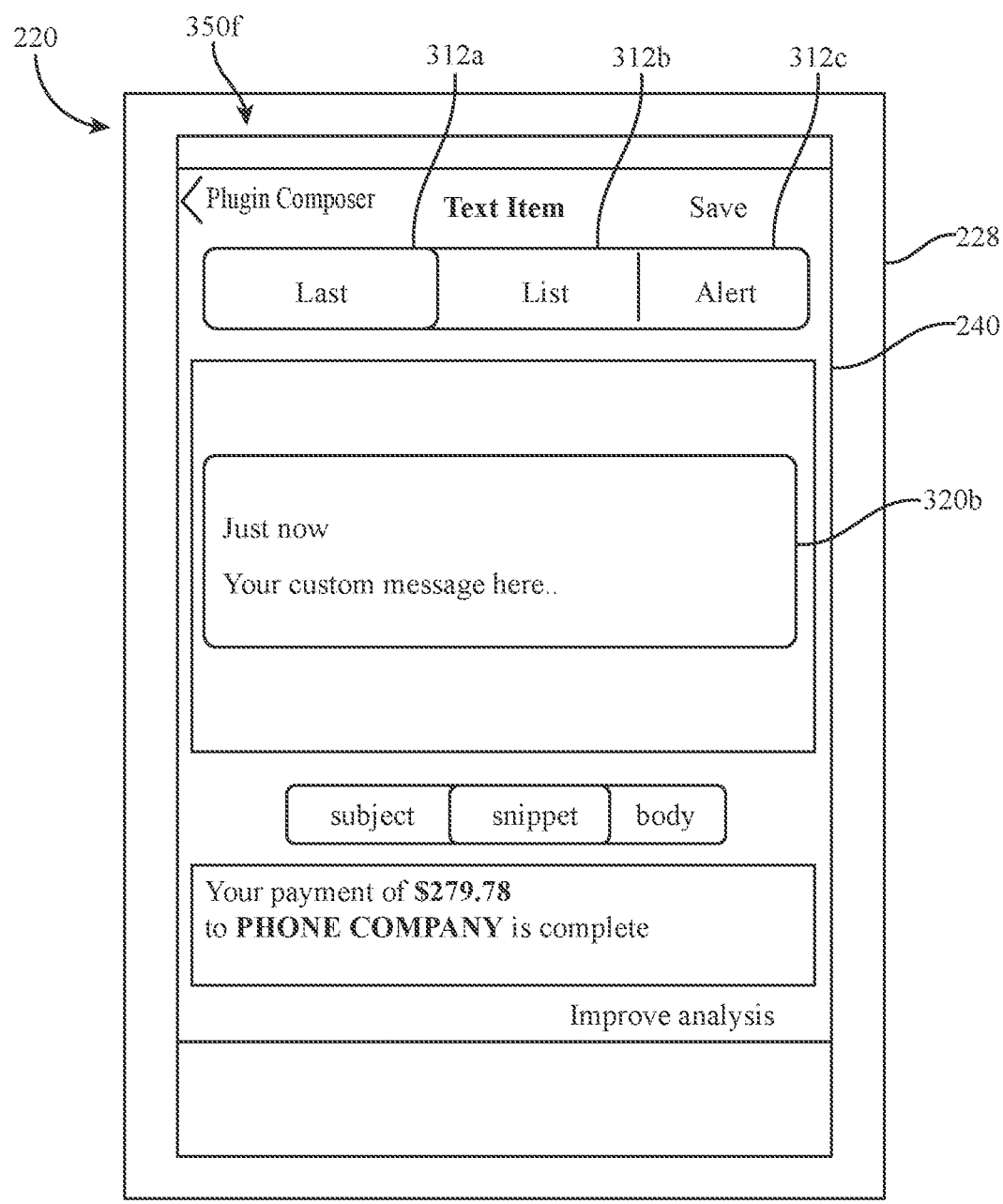

FIG. 3F depicts an example view 350f of the graphical user interface for configuring a text-type widget. The view 350f may be similar to the views 350a—e discussed above. The view 350f may include a widget preview 320b, which shows a preview of the widget being created. A user may select a presentation format using the buttons 312a, 312b, and 312c. The widget may be configured to display text data extracted from a most-recent (e.g., last) message of a cluster by the user selecting the "Last" button 312a, to display a list of text data extracted from messages of a cluster by a user selecting the "List" button 312b, or to provide an alert (e.g., a push or other type of notification) based on text data extracted from a cluster of messages by selecting the "Alert" button 312c. Note that the example presentation formats shown and described with respect to FIG. 3F are examples and are not meant to be limiting. In various embodiments, users may select additional or alternative presentation formats by providing inputs to the graphical user interface.

Figure 4:
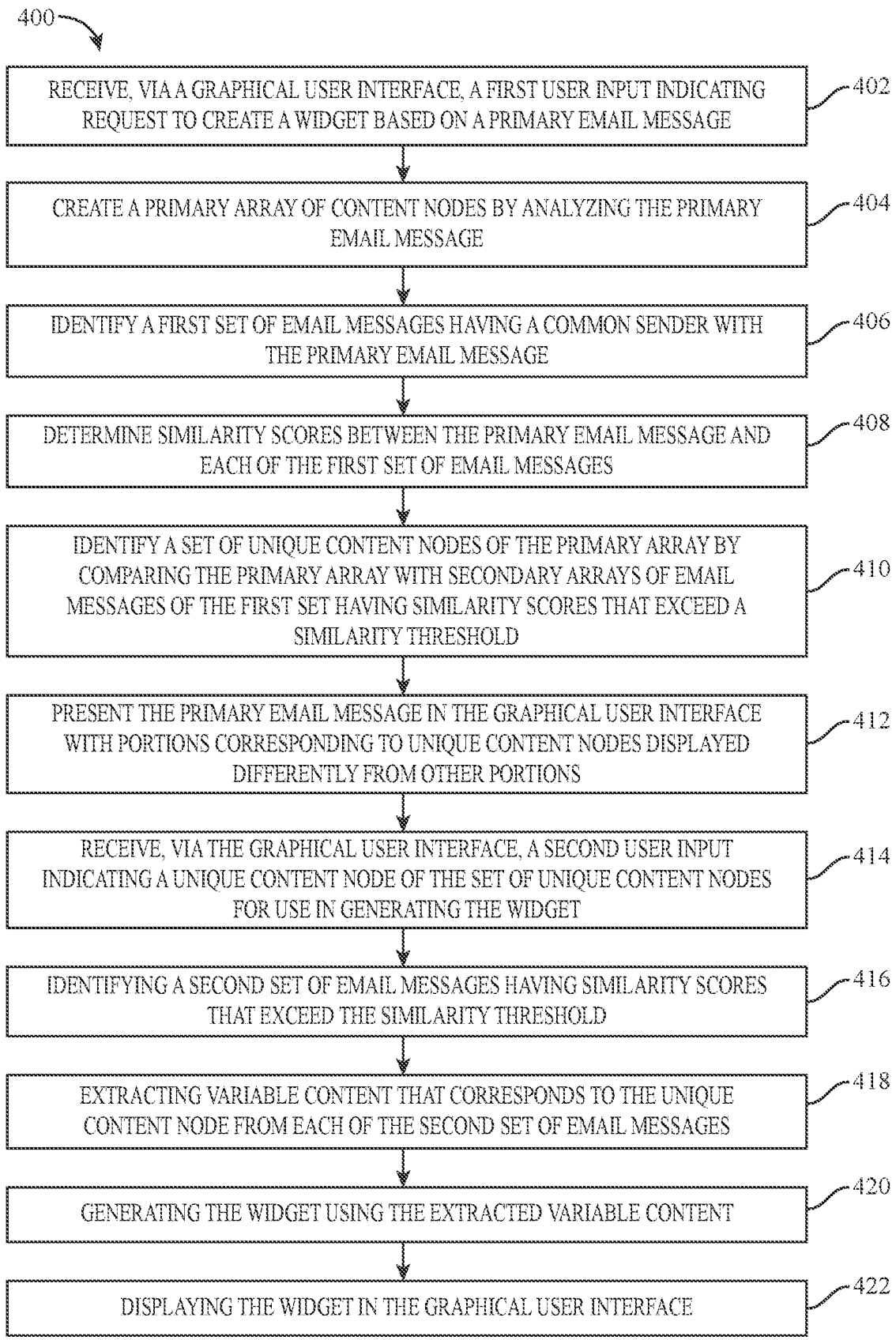
FIG. 4 is a flowchart depicting example operations of a method for extracting data from messages to create a widget.

FIG. 4 is a flowchart depicting example operations of a method 400 for extracting data from messages to create a widget. The method 400 can be performed in whole or in part by a widget management service and/or any suitable hardware or software combination, such as described above with reference to FIG. 1.

At operation 402, the widget management service receives, via a graphical user interface, a first user input indicating a request to create a widget based on a primary email message. As one example, a user may select the "Create Widget" button 270 shown in FIG. 2B. In some cases, the widget management service provides at least a portion of the primary email message for viewing in the graphical user interface, such as discussed above with respect to FIGS. 2A-2C. The first user input may be received while the portion of the primary email message is displayed in the user interface, or the first user input may otherwise specify the primary email message as the primary message for the widget creation process. The widget management service may obtain the primary email message, for example from an email server, before or after receiving the first user input.

At operation 404, the widget management service creates a primary array of content nodes by analyzing the primary email message. The content nodes of the primary array may include portions of the message (e.g., portions of the subject, snippet, and/or body of an email). In some cases, each content node corresponds to a word or uninterrupted text string of the message. In some cases, each content node corresponds to a section of multiple words or uninterrupted text strings of the message. Each content node may include numerical data, textual data, links (e.g., hyperlinks), images, and other types of content. In some cases, the primary email message (and other email messages discussed herein) may include content in a markup language such as HTML.

At operation 406, the widget management service identifies a first set of email messages having the same sender as the primary email message. The widget management service may identify fewer than all of the available messages having the same sender (e.g., a predefined number of messages or a number of messages within a predefined range). The widget management service may create a secondary array of content nodes for each of the set of email messages. The content nodes of the secondary arrays may be similar to the content nodes for the primary array such that each content node of a secondary array can be mapped to and compared with a corresponding content node of the primary array.

At operation 408, the widget management service determines similarity scores between the primary email message and each of the first set of email messages. The widget management service may determine similarity scores by comparing the content nodes of the primary array to the content nodes of each of the secondary arrays. The widget management service may use any suitable method for comparing the arrays, including longest common subsequence analysis. Email messages in the set having similarity scores that exceed a predetermined similarity threshold (e.g., 50%, 75%, 80%, 90%, or higher) may be added to a cluster for further analysis.

At operation 410, the widget management service identifies a set of unique content nodes of the primary array by comparing the primary array with secondary arrays of email messages in the first set having similarity scores that exceed the similarity threshold. The widget management service may again compare each secondary array for email messages in the cluster to the primary array to identify which content nodes of the primary array are unique compared to the secondary arrays, which indicates portions of the primary email that are unique compared to the other email messages in the cluster.

At operation 412, the widget management service presents the primary email message in the graphical user interface with portions corresponding to the unique content nodes displayed differently from other portions. For example, as shown in FIGS. 3D-3F, portions of an email message (or other message) corresponding to unique nodes may be shown in bold or otherwise formatted or highlighted differently than other portions of the message. In some cases, as discussed above with respect to FIGS. 3D and 3E, a user may provide additional inputs via the graphical user interface to edit which portions of the message are identified as unique, for example by selecting different parts of the message and indicating whether they are unique.

At operation 414, the widget management service receives, via the graphical user interface, a second user input indicating a unique content node of the set of unique content nodes for use in generating the widget. The user may select, via the graphical user interface, a portion of the primary email message that corresponds to a unique content node for use in generating the widget, as discussed in more detail with respect to FIGS. 3D and 3E. The user may provide additional inputs to specify the widget configuration, including specifying a widget type (e.g., numerical and/or textual), a presentation format (e.g., list, most-recent, alert, aggregated metric, etc.), and the like. The widget management service may maintain or otherwise store a widget configuration file that includes widget configuration information and data (e.g., unique content nodes) for presentation via the widget. Once created, the data displayed by a widget may be determined from the same set of messages used to create the widget or a different set of messages (associated with the same user and/or different users). For example, a widget may display data from messages in a particular folder or directory (e.g., an email inbox), messages received during a particular time period, or all messages determined to be sufficiently similar to the primary email message.

Once the widget is configured, the widget management service may identify messages from which to extract data for display by the widget. At operation 416, the widget management service identifies a second set of email messages having similarity scores that exceed a similarity threshold. The similarity threshold may be the same similarity threshold as the similarity threshold in operation 408, or it may be different. In some cases, the similarity threshold is greater than the similarity threshold in operation 408. The second set of email messages may be or include all or some of the messages used to configure the widget, or they may be different messages. At operation 418, the widget management service extracts variable content that corresponds to the unique content node from each of the second set of email messages. The widget management service may create arrays of content nodes for each message in the second set, and identify content nodes that correspond to the determine unique content nodes of the primary array from which to extract data. At operation 420, the widget management service generates the widget using the extracted variable content. At operation 422, the widget management service displays the widget in the graphical user interface.

Figure 5:
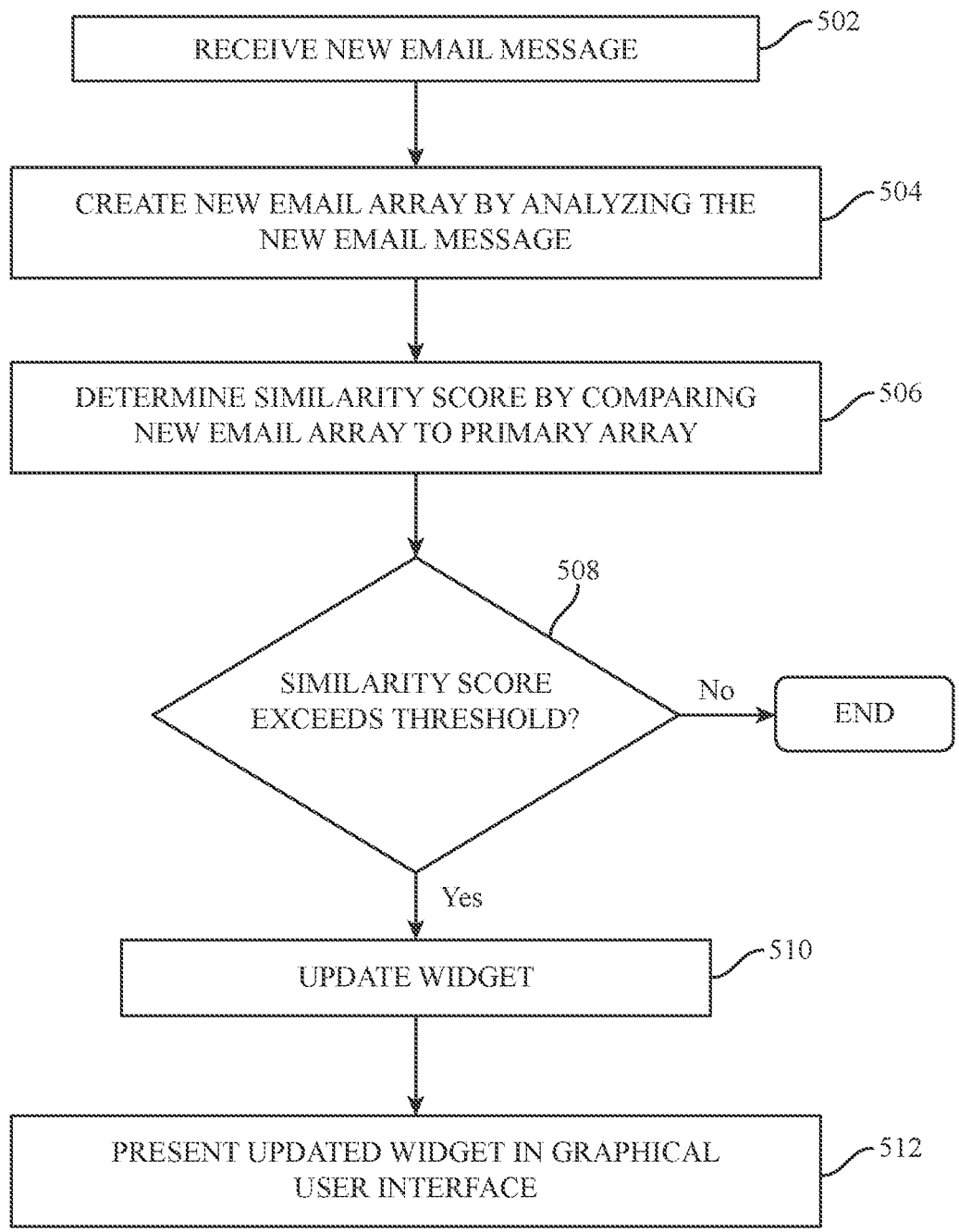
FIG. 5 is a flowchart depicting example operations of a method for updating a widget based on a new message.

FIG. 5 is a flowchart depicting example operations of a method 500 for updating a widget based on a new message. The method 500 can be performed in whole or in part by a widget management service and/or any suitable hardware or software combination, such as described above with reference to FIG. 1.

At operation 502, the widget management service receives a new email message, for example from an email server. At operation 504, the widget management service creates a new email array of content nodes by analyzing the new email message, similar to the creation of the arrays of content nodes discussed above with respect to FIG. 4. At operation 506, the widget management service determines a similarity score by comparing the new email array to the primary array associated with a widget, similar to the computation of the similarity score discussed above with respect to FIG. 4.

At operation 508, the widget management service determines whether the similarity score exceeds a similarity threshold. In some cases, the similarity threshold is the same or different (e.g., greater than) other similarity thresholds discussed herein. If the similarity score does not exceed the similarity threshold, the process ends. If the similarity threshold does exceed the similarity threshold, the process proceeds to operation 510.

At operation 510, the widget management service updates the widget using data extracted from the new email message. For example, if the widget includes an aggregated metric, the widget management service may re-compute the aggregated metric. Similarly, if the widget includes a list, data extracted from the new email message may be added to the list. At operation 512, the widget management service presents the updated widget in the graphical user interface.

Figure 6:
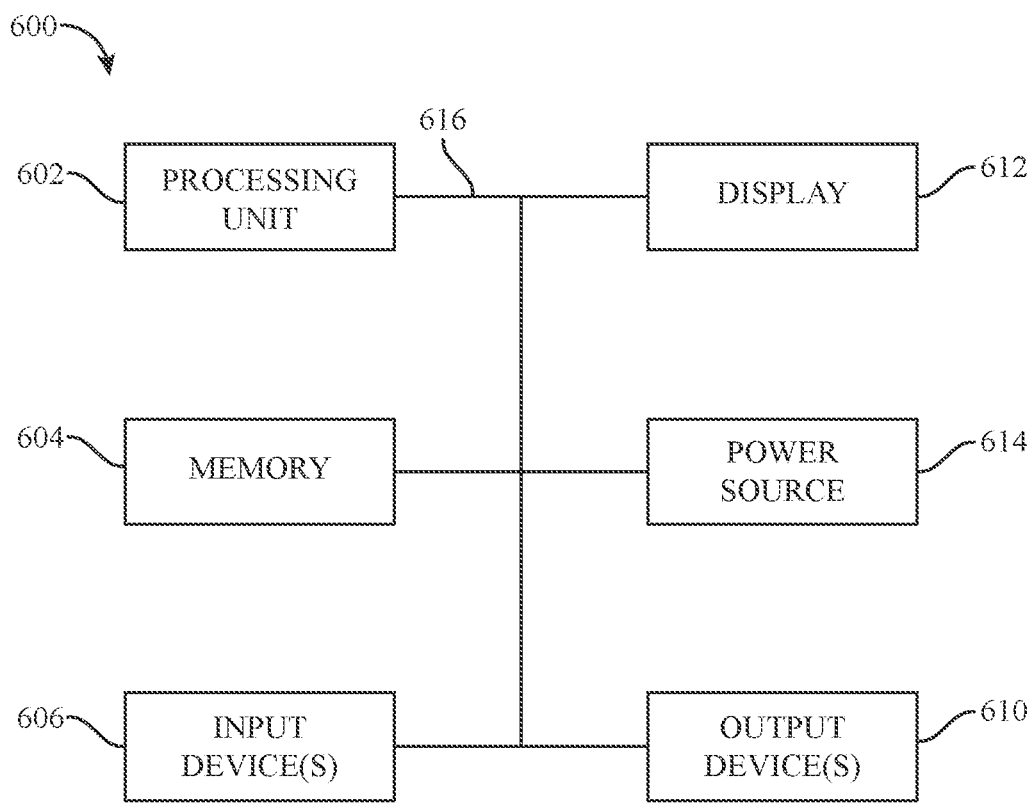
FIG. 6 illustrates a sample electrical block diagram of an electronic device that may perform the operations described herein.

FIG. 6 illustrates a sample electrical block diagram of an electronic device 600 that may perform the operations described herein. The electronic device 600 may in some cases take the form of any of the electronic devices described with reference to FIGS. 1-5, including one or more servers or other computing devices (e.g., resource allocations 122) of the widget management service 120, messaging server 110, client devices 130, third-party servers 140 and/or servers or other devices associated with the system 100. The electronic device 600 can include one or more of a display 612, a processing unit 602, a power source 614, a memory 604 or storage device, input devices 606, and output devices 610. In some cases, various implementations of the electronic device 600 may lack some or all of these components and/or include additional or alternative components.

The processing unit 602 can control some or all of the operations of the electronic device 600. The processing unit 602 can communicate, either directly or indirectly, with some or all of the components of the electronic device 600. For example, a system bus or other communication mechanism 616 can provide communication between the processing unit 602, the power source 614, the memory 604, the input device(s) 606, and the output device(s) 610.

The processing unit 602 can be implemented as any electronic device capable of processing, receiving, or transmitting data or instructions. For example, the processing unit 602 can be a microprocessor, a central processing unit (CPU), an application-specific integrated circuit (ASIC), a digital signal processor (DSP), or combinations of such devices. As described herein, the term "processing unit" is meant to encompass a single processor or processing unit, multiple processors, multiple processing units, or other suitably configured computing element or elements.

It should be noted that the components of the electronic device 600 can be controlled by multiple processing units. For example, select components of the electronic device 600 (e.g., an input device 606) may be controlled by a first processing unit and other components of the electronic device 600 (e.g., the display 612) may be controlled by a second processing unit, where the first and second processing units may or may not be in communication with each other.

The power source 614 can be implemented with any device capable of providing energy to the electronic device 600. For example, the power source 614 may be one or more batteries or rechargeable batteries. Additionally or alternatively, the power source 614 can be a power connector or power cord that connects the electronic device 600 to another power source, such as a wall outlet.

The memory 604 can store electronic data that can be used by the electronic device 600. For example, the memory 604 can store electronic data or content such as, for example, audio and video files, documents and applications, device settings and user preferences, timing signals, control signals, and data structures or databases. The memory 604 can be configured as any type of memory. By way of example only, the memory 604 can be implemented as random access memory, read-only memory, Flash memory, removable memory, other types of storage elements, or combinations of such devices.

In various embodiments, the display 612 provides a graphical output, for example associated with an operating system, user interface, and/or applications of the electronic device 600. In one embodiment, the display 612 includes one or more sensors and is configured as a touch-sensitive (e.g., single-touch, multi-touch) and/or force-sensitive display to receive inputs from a user. For example, the display 612 may be integrated with a touch sensor (e.g., a capacitive touch sensor) and/or a force sensor to provide a touch- and/or force-sensitive display. The display 612 is operably coupled to the processing unit 602 of the electronic device 600.

The display 612 can be implemented with any suitable technology, including, but not limited to liquid crystal display (LCD) technology, light emitting diode (LED) technology, organic light-emitting display (OLED) technology, organic electroluminescence (OEL) technology, or another type of display technology. In some cases, the display 612 is positioned beneath and viewable through a cover that forms at least a portion of an enclosure of the electronic device 600.

In various embodiments, the input devices 606 may include any suitable components for detecting inputs. Examples of input devices 606 include light sensors, temperature sensors, audio sensors (e.g., microphones), optical or visual sensors (e.g., cameras, visible light sensors, or invisible light sensors), proximity sensors, touch sensors, force sensors, mechanical devices (e.g., crowns, switches, buttons, or keys), vibration sensors, orientation sensors, motion sensors (e.g., accelerometers or velocity sensors), location sensors (e.g., global positioning system (GPS) devices), thermal sensors, communication devices (e.g., wired or wireless communication devices), resistive sensors, magnetic sensors, electroactive polymers (EAPs), strain gauges, electrodes, and so on, or some combination thereof. Each input device 606 may be configured to detect one or more particular types of input and provide a signal (e.g., an input signal) corresponding to the detected input. The signal may be provided, for example, to the processing unit 602.

As discussed above, in some cases, the input device(s) 606 include a touch sensor (e.g., a capacitive touch sensor) integrated with the display 612 to provide a touch-sensitive display. Similarly, in some cases, the input device(s) 606 include a force sensor (e.g., a capacitive force sensor) integrated with the display 612 to provide a force-sensitive display.

The output devices 610 may include any suitable components for providing outputs. Examples of output devices 610 include light emitters, audio output devices (e.g., speakers), visual output devices (e.g., lights or displays), tactile output devices (e.g., haptic output devices), communication devices (e.g., wired or wireless communication devices), and so on, or some combination thereof. Each output device 610 may be configured to receive one or more signals (e.g., an output signal provided by the processing unit 602) and provide an output corresponding to the signal.

In some cases, input devices 606 and output devices 610 are implemented together as a single device. For example, an input/output device or port can transmit electronic signals via a communications network, such as a wireless and/or wired network connection. Examples of wireless and wired network connections include, but are not limited to, cellular, Wi-Fi, Bluetooth, IR, and Ethernet connections.

The processing unit 602 may be operably coupled to the input devices 606 and the output devices 610. The processing unit 602 may be adapted to exchange signals with the input devices 606 and the output devices 610. For example, the processing unit 602 may receive an input signal from an input device 606 that corresponds to an input detected by the input device 606. The processing unit 602 may interpret the received input signal to determine whether to provide and/or change one or more outputs in response to the input signal. The processing unit 602 may then send an output signal to one or more of the output devices 610, to provide and/or change outputs as appropriate.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

Example computing resources or appliances that may be configured to display graphical user interfaces, receive email, and/or send email (or send and/or receive other messages) as described herein (e.g., resource allocations described with respect to FIG. 1) include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

What is claimed is:

1. A method comprising:
    receiving, via a graphical user interface on a client device, a first user input indicating a request to create a widget based on a content of a primary email message displayed in the graphical user interface;
    processing the primary email message by extracting text from a body of the primary email message and generating a first array of content nodes using the extracted text of the primary email message;
    identifying a first set of email messages having a common sender with the primary email message;
    for each email message in the first set of email messages:
        processing the respective email message by extracting text from a body of the respective email message and generating a second array of content nodes using the extracted text of the respective email message;
        determining a similarity score between the primary email message and the email message by comparing the first array of content nodes to the second array of content nodes; and
        responsive to the similarity score exceeding a similarity threshold, identifying a set of unique content nodes of the first array by identifying content nodes of the first array that differ from corresponding content nodes of the second array;
    presenting, in the graphical user interface, at least part of the primary email message with portions of the content of the primary email message that correspond to the set of unique content nodes displayed differently from other portions of the content of the primary email message;
    receiving, via the graphical user interface, a second user input indicating a unique content node of the set of unique content nodes for use in generating the widget;
    extracting variable text content that corresponds to the unique content node from each of the first set of email messages;
    generating the widget using the extracted variable text content; and
    displaying the widget in the graphical user interface.

2. The method of claim 1, wherein:
    the similarity score is a first similarity score;
    the similarity threshold is a first similarity threshold;
    the variable text content is first variable text content; and
    the method further comprises:
        identifying a new email message received after creation of the widget;
        processing the new email message by extracting text from a body of the new email message and generating a third array of content nodes using the extracted text of the new email message;
        determining a second similarity score between the primary email message and the new email message by comparing a set of fixed content nodes of the first array to corresponding content nodes of the third array;
        responsive to the second similarity score exceeding a second similarity threshold, extracting second variable text content from the new email message that is associated with the corresponding content nodes of the third array;
        generating an updated widget using the extracted second variable text content; and
        displaying the updated widget in the graphical user interface.

3. The method of claim 2, wherein the second similarity threshold is greater than the first similarity threshold.

4. The method of claim 1, wherein:
    the similarity score is a first similarity score;
    responsive to the similarity score not exceeding the similarity threshold for each of the email messages in the first set, identifying a third set of email messages having the common sender; and
    for each email message in the third set of email messages:
        processing the respective email message by extracting text from a body of the respective email message and generating a third array of content nodes using the extracted text of the respective email message;
        determining a second similarity score between the primary email message and the respective email message by comparing the first array of content nodes to the third array of content nodes; and responsive to the second similarity score exceeding the similarity threshold, identifying the set of unique content nodes of the first array by identifying content nodes of the first array that differ from corresponding content nodes of the third array.

5. The method of claim 1, wherein:
determining the similarity score comprises determining a longest common subsequence ratio between the first array and the second array; and
the similarity threshold is between 50% and 90%.

6. The method of claim 1, wherein:
the similarity score is a first similarity score;
the similarity threshold is a first similarity threshold;
the set of unique content nodes is a first set of unique content nodes; and
the first array comprises the first set of unique content nodes and a set of fixed content nodes, each of the set of fixed content nodes being the same as a corresponding content node of the second array; and
the method further comprises:
 identifying a third set of email messages having the common sender;
 for each email message in the third set of email messages:
  processing the respective email message by extracting text from a body of the respective email message and generating a third array of content nodes using the extracted text of the respective email message;
  determining a second similarity score between the primary email message and the respective email message by comparing the set of fixed content nodes of the first array to corresponding content nodes of the third array; and
  responsive to the second similarity score exceeding a second similarity threshold, identifying a second set of unique content nodes of the first array by identifying content nodes in the set of fixed content nodes that differ from corresponding content nodes of the third array.

7. The method of claim 6, wherein the second similarity threshold is greater than the first similarity threshold.

8. The method of claim 1, wherein:
each extracted variable text content comprises a text string; and
the widget comprises a list of text strings.

9. The method of claim 1, wherein:
the extracted variable text content comprises a set of numerical values, each of the set of numerical values extracted from a content of an email message of the first set of email messages; and
the widget comprises at least one of a list or a chart of the set of numerical values.

10. The method of claim 1, wherein:
the extracted variable text content comprises a set of a numerical values, each of the set of numerical values extracted from a content of an email message of the first set of email messages; and
the widget comprises at least one of an average or a sum of the set of numerical values.

11. A method comprising:
receiving a new email message;
processing the new email message by extracting text from a body of the new email message and generating a new email array of content nodes using the extracted text of the new email message;
determining a similarity score between the new email array and a primary array of content nodes corresponding to a widget displayed in a graphical user interface, each content node of the primary array comprising text extracted from a body of a primary email message associated with the widget;
responsive to the similarity score exceeding a similarity threshold, extracting data from a content node of the new email message that corresponds to a unique content node of the primary array;
updating the widget using the extracted data; and
presenting the updated widget in the graphical user interface.

12. The method of claim 11, wherein:
the widget comprises a list of data elements, each data element of the list comprising data extracted from a content of a different email message of a cluster of email messages; and
updating the widget comprises adding, to the list of data elements, a data element comprising the extracted data.

13. The method of claim 11, wherein:
the widget comprises an aggregated metric determined by analyzing data extracted from a content of each of a cluster of email messages; and
updating the widget comprises determining an updated aggregated metric using the extracted data.

14. The method of claim 13, wherein:
the extracted data comprises a numerical value;
the aggregated metric is a sum of numerical values from the cluster of email messages; and
determining the updated aggregated metric comprises adding the numerical value to the sum of numerical values.

15. A system comprising:
a client device operating a client application configured to receive, via a graphical user interface provided by the client application, a first user input indicating a request to create a widget based on a content of a primary email message displayed in the graphical user interface; and
a widget management service configured to:
 processing the primary email message by extracting text from a body of the primary email message and generating a first array of content nodes using the extracted text of the primary email message;
 identify a secondary email message having a common sender with the primary email message;
 processing the secondary email message by extracting text from a body of the secondary email message and generating a second array of content nodes using the extracted text of the secondary email message;
 determine a similarity score between the primary email message and the secondary email message by comparing the first array of content nodes to the second array of content nodes;
 responsive to the similarity score exceeding a similarity threshold, identify a set of unique content nodes of the first array by identifying content nodes of the first array that differ from corresponding content nodes of the second array;
 present, in the graphical user interface, at least part of the primary email message with portions of the content of the primary email message that correspond to the set of unique content nodes displayed differently from other portions of the primary email message;

extract, from the secondary email message, variable text content that corresponds to a unique content node of the set of unique content nodes;

generate the widget using the extracted variable text content; and cause the client application to display the widget in the graphical user interface.

16. The system of claim 15, wherein:

the unique content node is a first unique content node;

content nodes of the first array comprise the set of unique content nodes and a set of fixed content nodes; and the widget management service is further configured to:

receive a second user input indicating that a fixed content node of the set of fixed content nodes should be a second unique content node; and changing a node type of the fixed content node to indicate that it is the second unique content node.

17. The system of claim 16, wherein the widget management service is further configured to display a portion of the content of the primary email message corresponding to the second unique content node differently from other portions of the content of the primary email message.

18. The system of claim 15, wherein:

the variable text content comprises a numerical value; and the widget comprises a list of numerical values extracted from a content of each of a set of email messages.

19. The system of claim 15, wherein:

the variable text content comprises a numerical value; and the widget comprises at least one of an average or a sum of a set of numerical values extracted from a content of each of a set of email messages.

20. The system of claim 15, wherein:

the variable text content is first variable text content; and the widget management service is further configured to:

receive, via the graphical user interface, a second user input indicating the unique content node of the set of unique content nodes for use in generating the widget;

identify a third email message having a similarity score that exceeds the similarity threshold, the third email message comprising second variable text content that corresponds to the indicated unique content node;

extract the second variable text content from the third email message; and generate the widget using the first variable text content and the second variable text content.

\* \* \* \* \*